United States Patent
Roberts

(10) Patent No.: US 7,303,123 B2
(45) Date of Patent: Dec. 4, 2007

(54) METHOD OF LABELING AN ITEM FOR ITEM-LEVEL IDENTIFICATION

(75) Inventor: William Peyton Roberts, Spartanburg, SC (US)

(73) Assignee: Cryovac, Inc., Duncan, SC (US)

( * ) Notice: Subject to any disclaimer, the term of this patent is extended or adjusted under 35 U.S.C. 154(b) by 198 days.

(21) Appl. No.: 11/052,188

(22) Filed: Feb. 7, 2005

(65) Prior Publication Data

US 2006/0175401 A1   Aug. 10, 2006

(51) Int. Cl.
*G06K 7/10* (2006.01)
(52) U.S. Cl. .................... 235/383; 235/462.01
(58) Field of Classification Search ................
235/462.01–462.17, 375, 381, 382, 383,
235/385, 494; 705/2, 408, 406
See application file for complete search history.

(56) References Cited

U.S. PATENT DOCUMENTS

| | | | |
|---|---|---|---|
| 5,388,049 A * | 2/1995 | Sansone et al. ............. | 705/406 |
| 6,019,394 A | 2/2000 | Chenoweth et al. | |
| 6,085,172 A | 7/2000 | Junger | |
| 6,269,344 B1 | 7/2001 | Junger | |
| 6,415,978 B1 | 7/2002 | McAllister | |
| 6,697,812 B1 | 2/2004 | Martin | |
| 6,712,276 B1 | 3/2004 | Abali et al. | |
| 2001/0011231 A1 | 8/2001 | Junger | |
| 2002/0133425 A1 | 9/2002 | Pederson et al. | |
| 2002/0134834 A1 | 9/2002 | Otto | |
| 2002/0165795 A1 | 11/2002 | Holley et al. | |
| 2002/0169671 A1 | 11/2002 | Junger | |
| 2002/0188531 A1 | 12/2002 | Junger | |
| 2003/0083944 A1 | 5/2003 | Duvall et al. | |
| 2003/0165602 A1 | 9/2003 | Garwood | |
| 2003/0177053 A1 | 9/2003 | Otto | |
| 2003/0204409 A1 | 10/2003 | Gorski et al. | |
| 2004/0032330 A1 | 2/2004 | Hoffman | |
| 2004/0123565 A1 * | 7/2004 | Rice et al. ..................... | 53/415 |
| 2005/0184151 A1 * | 8/2005 | DiMaggio et al. .......... | 235/385 |
| 2005/0187791 A1 * | 8/2005 | DiMaggio et al. ............. | 705/2 |
| 2006/0086791 A1 * | 4/2006 | Austin ........................ | 235/385 |

OTHER PUBLICATIONS

Combating Counterfeit Drugs—A Report of the Food and Drug Administration, Feb. 18, 2004.
"Avicon's RFID Enablement Framework," *epcExpress™ Architecture*, pp. 1-6; Sep. 2004.

(Continued)

*Primary Examiner*—Thien Minh Le
(74) *Attorney, Agent, or Firm*—Alston & Bird LLP

(57) ABSTRACT

The invention is a method of validating a label that includes the steps of reading a product-specific code disposed on an item; retrieving a stored verification code corresponding to the product-specific code; reading a label verification code disposed on a label having a serial number encoded thereon; and determining whether the stored and label verification code match. If the stored and label verification codes match, the label is considered valid. In one embodiment, once the label is validated, the product-specific code and the serial number may be combined to generate a unique item-level identification code for the particular item. The use of the stored verification code and label verification code may help prevent attaching an incorrect label to the item.

21 Claims, 4 Drawing Sheets

OTHER PUBLICATIONS

"EPC and Radio Frequency Identification (RFID) Standards," Matrics, pp. 1-8, 2004.

"Managing the EPC Generation Gap—An overview of EPC standard migration from Generation 1 to Generation 2 RFID tags," Zebra Technologies, pp. 1-7, 2004.

Press Release Dated Feb. 10, 2003, Manhattan Associates and Zebra Technologies to Provide Joint RFID-Enabled Supply Chain Execution Solution.

Search Report and Written Opinion for PCT/US2006/04111 dated Jan. 16, 2007.

Collins, "Six U.K. Drugmakers Pilot RFID," RFID Journal; http://www.rfidjournal.com/article/view/1247; Nov. 19, 2004.

O'Connor, "Bar Coding for Item Tracking," RFID Journal; http://www.rfidjournal.com/article/articleview/1309/1/1; Jan. 6, 2005.

"Zebra's RFID Readiness Guide: Complying with RFID Tagging Mandates," Zebra Technologies, pp. 1-8; Published at least as of Feb. 6, 2005.

Press Release Dated Feb. 10, 2003, Manhattan Associates and Zebra Technologies to Provide Joint RFID-Enabled Supply Chain Execution Solution.

EPC: Electronic Product Code-The New Generation RFID Based Product Identification System, Section Three, pp. 93-102, Oct. 2004.

How the EPCglobal Network™ Works; http://www.epcglobalus.org/Network/how_works.html; 2004.

Electronic Product Code; http://www.epcglobalus.org/Network/Electronic%20Product%Code,html; 2004.

EPCglobal Frequently Asked Questions; http://www.epcglobalinc.org/about/faqs.html; 20003.

* cited by examiner

METHOD OF LABELING AN ITEM FOR ITEM-LEVEL IDENTIFICATION

BACKGROUND OF THE INVENTION

The present invention relates generally to a method of validating a label for application to an item and to a method of combining a product-specific code with a serialized bar code to generate a unique item-level identification.

Items sold by retailers may be encoded with a product-specific code that can be used to retrieve product-specific information such as price, inventory, and the like. The code can be in the form of a bar code or other encoded symbols that are typically printed on the item. The most common product-specific codes include Uniform Product Codes (UPC), Global Trade Identification Numbers (GTIN), and European Article Numbering (EAN-13) codes. Product-specific codes include product specific information that corresponds to a type or class of product.

Retail stores may be equipped with point-of-sale (POS) terminals that allow a retailer to quickly determine product-specific information from the product-specific codes. Conventional POS terminals typically include an optical scanner, such as a bar code reader, and a terminal that is connected to a local network. At the POS, the retailer will scan the code with the bar code reader. The bar code reader can then either process the code with a processor located within the scanner, or transfer the code to a separate terminal for processing. The product-specific information can be used, for example, to retrieve the price of the item from a local database located within the retail store.

Retailers may desire manufacturers and distributors to label items with item-specific information such as item-specific codes that are particular to the specific item being scanned. Such codes can be used to transmit serial numbers, check authenticity, expiration dates, ownership status, and the like. The uniqueness of the item-specific code is essential to recording and tracking item-specific information. One method of labeling an item comprises printing both the item-specific code and the product-specific code on the same label. However, to ensure uniqueness of the item-specific code, it would be necessary for the manufacturer to maintain an inventory of these labels or to employ just-in-time printing at the point in time when it is known which product is to be labeled. In manufacturing operations where numerous product-specific codes are used within the same location, this may result in logistical problems and additional expenses. There is also the risk of applying the wrong product-specific/serial number label to the product.

Thus, there still exists a need for a reliable method of labeling an item with an item-specific code that helps reduce the chance of placing the wrong label on an item.

SUMMARY OF THE INVENTION

One embodiment of the invention is directed to a method of validating a label having item-specific information to help reduce the possibility of placing the wrong label on an item. The method comprises reading a product-specific code disposed on an item; retrieving a stored verification code corresponding to the product-specific code; reading a label verification code disposed on a label having a serial number encoded thereon; and determining whether the stored and label verification codes match. The label is valid if the stored and label verification codes match. In one embodiment, once the label is validated, the product-specific code and the serial number may be combined to generate an item-level identification code for the item. In another embodiment, the verified label is attached to the item. If the stored and label verification codes do not match, the label is rejected.

Another embodiment of the invention is directed to a method of generating an item-level identification code for an item that comprises providing a verification code; associating a plurality of serial numbers with the verification code, wherein each serial number of the plurality of serial numbers is different from the remaining serial numbers of the plurality of serial numbers; associating one or more product-specific codes with the verification code; and combining one of the plurality of serial numbers with one of the product-specific codes to generate the item-level identification code.

A further embodiment of the invention is directed to an item-specific identifier system comprising an item displaying a product-specific code; a label attached to the item distinct from the product-specific code, wherein the label includes a serial number and a verification code, and wherein the serial number and the product-specific code are each associated with the verification code within a database.

The use of a verification code may help a manufacturer or supplier to more effectively manage the generation of item-level identifications codes at a particular manufacturing location or within a particular time frame, for example, without the increase in costs that are commonly associated with the use of RFID tags. The verification code may allow the manufacturer to use pre-printed serialized bar code labels that can be validated before or immediately after the label is attached to a particular item. As a result, the verification code may help to ensure the uniqueness of the resulting item-level identification code.

The invention may provide a cost effective means to label an item with an item-level identification code that may help ensure the uniqueness of the item-level identification code.

BRIEF DESCRIPTION OF THE DRAWINGS

Figure 1:
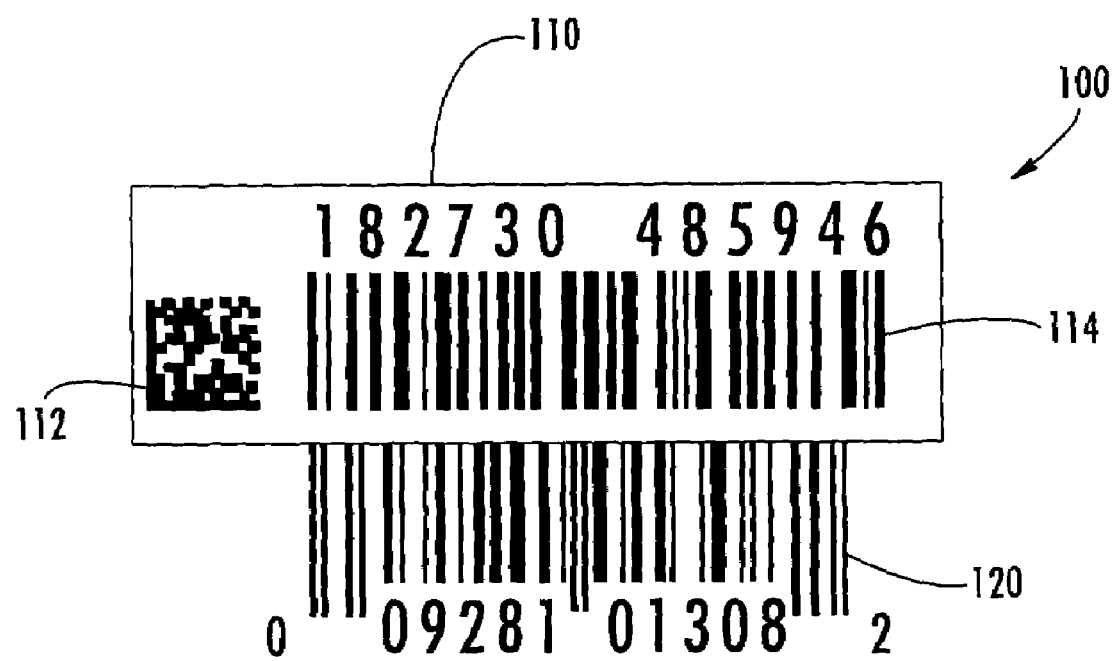
Figure 2:
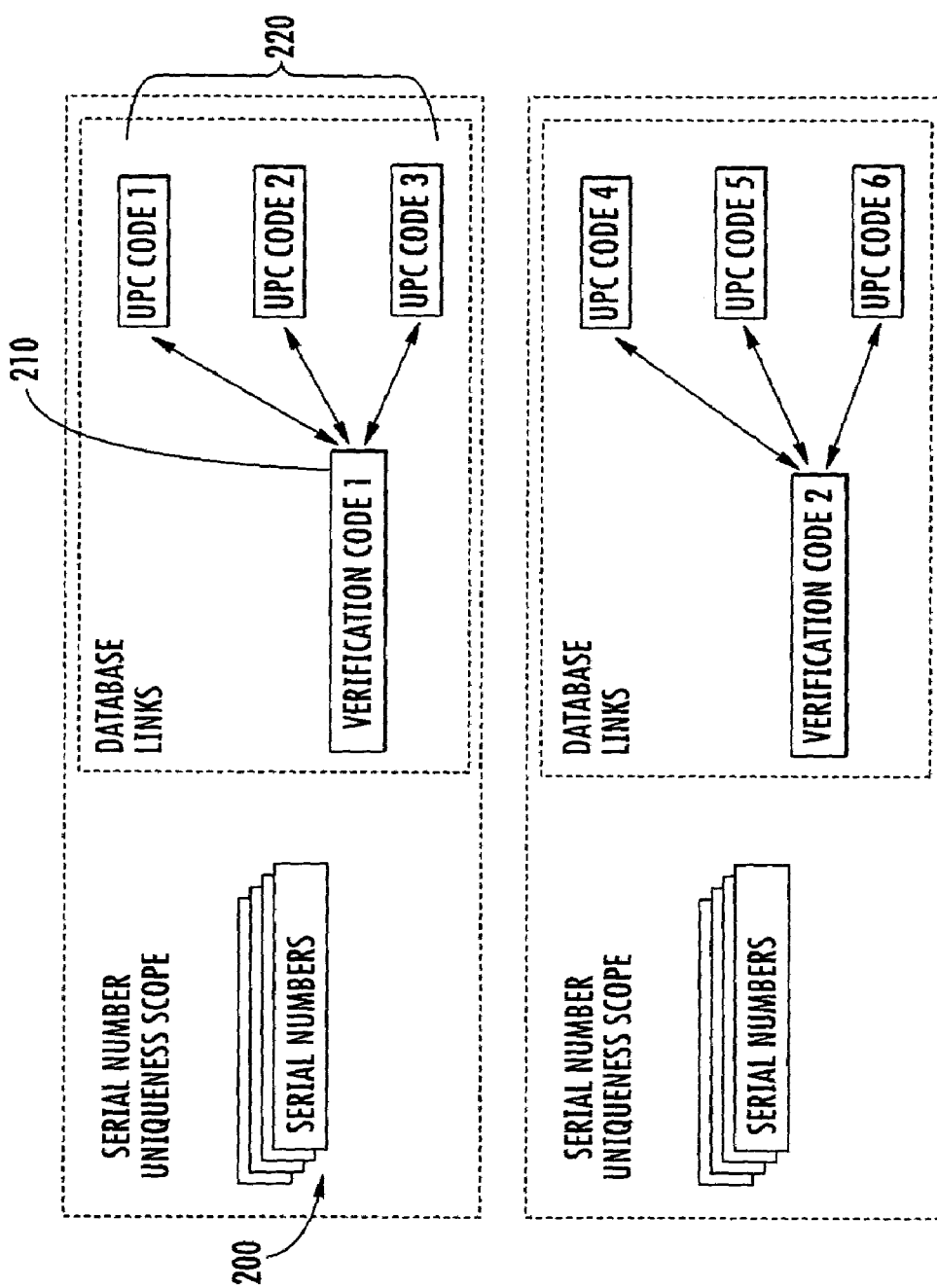
Figure 3:
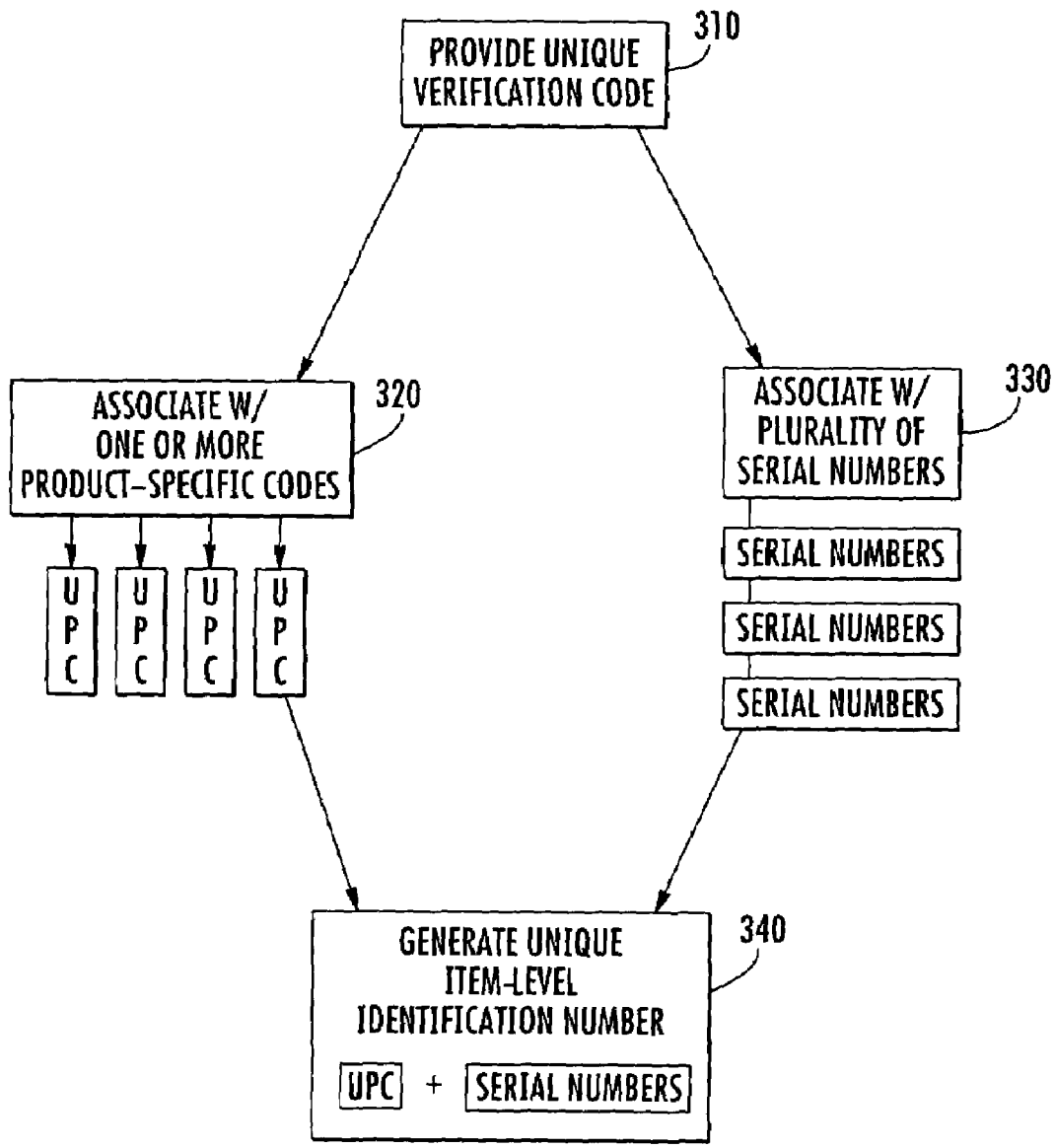
Figure 4:
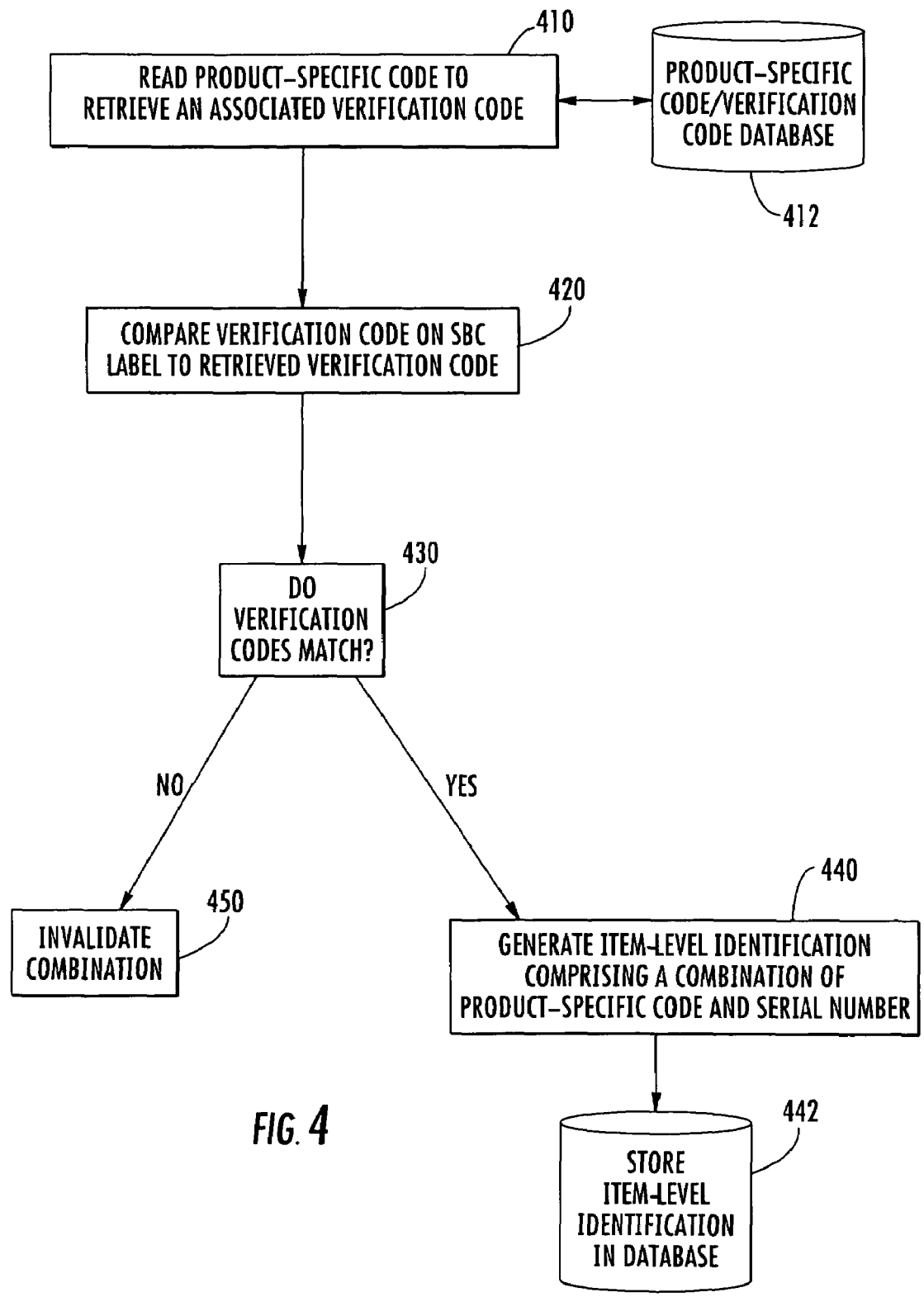

Having thus described the invention in general terms, reference will now be made to the accompanying drawings, wherein:

FIG. 1 is a graphical illustration of a product-specific code that has been combined with a label having a serialized bar code and a verification code;

FIG. 2 is a graphical illustration depicting the association of the verification codes with the serial numbers and the product-specific codes;

FIG. 3 is a graphical representation of a flow chart depicting the steps involved in generating the item-level identification; and FIG. 4 is a graphical representation of a flow chart depicting the steps involved in verifying that a serialized bar code label is being combined with an appropriate product-specific code.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

With reference to FIG. 1, an item-specific identifier comprising a serialized bar code (SBC) label in combination with a product-specific code is illustrated and broadly designated as reference 100. The combination 100 comprises a SBC label 110 and a product-specific code 120. The SBC label 110 includes a serial number that may be in the form of a serialized bar code 114. The product-specific code 120, and the serial number 114 can be combined to generate a unique item-level identification code for the particular item being scanned. This item-level identification code can be used to retrieve and store item-specific information. Item-specific information contains item-specific codes that are particular to the specific item or object being scanned. As mentioned above, such codes can be used to transmit serial numbers, check authenticity, expiration dates, ownership status, and the like.

In one embodiment of the invention, the item-level identification code may be in the form of an electronic product code (EPC). Electronic Product Codes are a unique numbering system that may have the possibility to allow every company in the supply chain, including retailers, to track products at the individual item level. EPC codes can be used to track products, cases, and pallets in the supply channel, at the point of sale, and in some circumstances in post sale transactions. As a result, EPC codes may be used to track an individual item from when it was made to when it was sold or consumed.

In some embodiments, the EPC may be divided into numbers that identify the manufacturer and product-specific code. The EPC may also include an extra set of digits comprising a serial number that can be used to uniquely identify a particular item. Each serial number is associated with only a single product-specific code.

The product-specific code may comprise a label or printed indicia that may be predisposed on an item that is to be assigned an item-level identification code. The term "item" may include the product itself and any labeling or packaging that may be associated with the product. In some embodiments, the product-specific code 120 may be displayed in the form of a bar code that can be read with a data entry device, such as an optical bar code scanner. The product-specific code can be used to retrieve product-specific information for the item. Product-specific information may include product pricing, inventory, or other information that corresponds to a type or class of products. Product-specific codes may be in the form of, for example, UPC codes, European Article Numbering (EAN-13) codes, Global Trade Item Numbers (GTIN) codes, and the like. Product-specific codes are limited to a class of products and are not used to convey item-level or item-specific information that is unique to a particular item or object. Product-specific codes may be used to track inventory, price, sales, statistics, and the like.

The serial numbers may be generated in sequential numbering order or alternatively in a random or semi-random sequence. A random or semi-random sequence makes it difficult to predict one serial number from the next, which makes creating counterfeit serial numbers more difficult. The serial number may be encoded in the form of a serialized bar code that can also be read with a data entry device such as an optical bar code scanner. Both or either the product-specific code and the serialized bar code may comprise one-dimensional symbology that can be read by the majority of commercially available bar code scanners. Other methods of encoding the product-specific and item-specific information that can be employed include RFID and two-dimensional bar code symbologies. The SBC label 110 may be positioned adjacent to the product-specific code 120; in this context, "adjacent to" means that the label and/or codes are positioned so that both codes can quickly be scanned at substantially the same moment or in quick succession of each other.

The SBC label may include a verification code 112. The verification code may provide a means to verify that the product-specific code is being combined with an appropriate serial number. A verification code may be associated with one or more product-specific codes. A verification code may also be associated with a plurality of serial numbers. Each serial number within the associated group is unique and different from the other serial numbers within the group. In this regard, FIG. 2 illustrates a database comprising a grouping of serial numbers 200 that are each associated with a unique verification code 210. Each verification code 210 may also be associated with one or more product-specific codes 220. Since each product-specific code (e.g., UPC) 220 is associated in the database with no verification code other than one selected verification code (e.g., verification code 1), the serial numbers associated with the selected verification code may be reused with additional verification codes.

With reference to FIG. 3, a flow chart depicting a process of generating an item-level identification code in accordance with an embodiment of the invention is illustrated. First, the manufacturer provides a unique verification code 310. The verification code 310 is then associated in a database with a plurality of serial numbers 330 and with one or more product-specific codes 320. As stated above, an individual product-specific code is not typically associated with more than one verification code. Each individual serial number may only appear once within a plurality of serial numbers 330. The product-specific code is then combined with one of the serial numbers to generate a unique item-level identification code 340 for a specific item or object.

In some embodiments, the verification code may be in the form of a bar code symbology that is encoded differently than the serial number bar code to help prevent the bar code scanner from inadvertently reading the verification code. As shown, the verification code may be in the form of a two-dimensional bar code symbology, such as a DataMatrix® 2-D bar codes. The verification code may alternatively or also take the form of alpha or numeric symbology, other symbols, magnetic memory devices such as a magnetic stripe, RFID tag, flash memory, and the like.

There may be more serial numbers available in the EPC numbering scheme than are likely to be needed for any single product-specific code. As a result, a manufacturer may allocate a grouping of serial numbers across multiple product-specific codes without exhausting the supply of available serial numbers. A manufacturer may pre-print labels displaying serialized bar codes and the label verification code; such labels may be used to label items having different product-specific codes. This may be particularly useful in circumstances where a manufacturer produces many different products at a single location. Since the verification code can be associated with more than one product-specific code, the manufacturer may transition among different products without having to generate new labels or new serial numbers. As a result, this embodiment of the invention may help provide a simplified approach to generating unique item-level identification codes. In some embodiments, the pre-printed SBC labels may be disposed on a continuous roll or sheet of such labels. A sheet or roll of pre-printed labels may only be associated with a single verification code. In some embodiments, two different verification codes may be present within a single sheet or roll of SBC labels provided that an operator applying the labels discerns the transition between the two verification codes.

With reference to FIG. 4, a flow chart that represents the flow of data through a system configured for labeling an item with a serial number is illustrated. As shown in FIG. 4, an item having a product-specific code such as a UPC is read or entered into the system with a data entry device at step 410. Suitable data entry devices include bar code scanners, keyboards, magnetic readers, and the like. The scanner is typically operatively connected to a database 412 which contains the product-specific codes and the associated verification code. In some embodiments, the scanner may be operatively connected to a centralized processing center that is configured to communicate with one or more scanners simultaneously. Typically, the scanner will communicate with the database to retrieve the stored verification code for the product-specific code that has been scanned into the system. In the next step 420, a label verification code encoded on the SBC label is read. The stored verification code is compared to the label verification code on the SBC label at step 430. If the verification codes match, the SBC label can then be attached to the item and an item-level identification code for the item is generated 440. In some embodiments, the label is attached to the item before the SBC label is validated. In the event the stored and label verification codes are not a match, the SBC label is typically removed, obscured, or not attached to the item and/or the combination of the product-specific code and the serial number is rejected by the system at step 450.

After validation of the verification codes, an item-level identification code for the item may be generated. To help ensure the uniqueness of the item-level identification code and that a particular serial number is never used twice with the same product-specific code, the label includes a verification code. Each verification code is associated with one or more product-specific codes and a plurality of serial numbers. The verification code can be associated with many different product-specific codes, but each product-specific code is only associated with a single verification code. Each individual serial number within the plurality of serial numbers is unique and different from the remaining serial numbers within the plurality of serial numbers. At the point of labeling, the product-specific code may be read to retrieve its corresponding stored verification code from a database. The verification code on the SBC label may also be read and compared to the retrieved stored verification code. In the event the stored and label verification codes do not match, an error is generated, and the use of the SBC label with that particular item is invalidated. If the stored and label verification codes match, the product-specific code and the serial number are combined to generate an item-level identification code. The item-level identification code may then be stored in a database. The stored item-level identification code may be used in subsequent transactions to monitor and track the particular item.

The generated item-level identification code may be transferred to an item-level database 442. In some embodiments, once the stored and label verification codes have been initially validated it may not be necessary to re-validate each subsequent label. For example, if the same product-specific code and verification code are being encountered repeatedly, the verification code may not have to be re-validated until there is a change in the product and/or supply of SBC labels. In some embodiments, the product-specific code and serial number for each successive item may be read so that an item-level identification code can be generated for each item. The item-level identification codes are then normally stored in the item-level database.

In some embodiments, scanning the SBC labels may occur at a relatively rapid rate. It is possible that an attached SBC label may fail to be scanned resulting in an item-level identification code not being generated and stored. To help prevent this occurrence, it may be desirable to generate an item-level identification code for all pre-printed serial numbers regardless of whether every SBC label has been scanned and/or attached to an item. As a result, an item-level identification code can be generated for each serial number in the database that has been printed and associated with the particular verification code. For a given product-specific code, an item-level identification code can be generated for each serial number by using scanned data to establish starting and end points for the serial numbers followed by combining the serial numbers within this range with the product-specific code. This step can be used to help ensure that substantially no item enters the distribution system without having a unique item-level identification code. In some embodiments, it may also be desirable to include a means for removing an item-level identification code from the database that has been rejected or unused.

The item-level database can be used to verify and record information regarding a particular item. Retailers, manufacturers, distributors, etc, may maintain item-level database(s), or they may be maintained by a separate data-hosting entity. The item-level database can be used for tracking, transmitting, and transferring data that is specific to the particular item that is scanned. In one embodiment of the invention, the system can be used for tracking the authenticity of goods, such as pharmaceuticals, expiration dates on perishable goods, serial numbers, product registrations, warranty information, prior sales, point of purchase, information of the purchaser, and the like. In a particularly useful form of the invention, a SBC label can be placed on a pharmaceutical product to generate a unique identification code for the particular package. At the point-of-sale, a retailer can scan the package for both product-specific information and item-specific information to reproduce the unique item-level identification code for the item. The item-level identification code can help facilitate the sharing of information between the retailer and the manufacturer. The item-level identification code may be used to submit sales transactional data, and/or in the case of a pharmaceutical product or other potentially counterfeit product, submit a query that requests authentication of the item-level identification code. The item-level database will typically record the query and process the item-level identification code to determine if the transaction should proceed. If the serial number is authenticated, the item-level database can transmit a response to the retailer that would indicate whether the sale should or should not be completed. If for example, the expiration date has expired for the particular item, the item-specific database could transmit instructions to remove and recall particular batch numbers.

In some embodiments, the label may comprise a Radio Frequency Identification RFID transponder, such as a RFID transponder embedded in the SBC label. RFID systems may be used to track and read item-level identification codes. RFID systems typically comprise a transponder or tag, which is attached to the item that is to be identified, and a reader. The reader sends an electromagnetic signal to the tag and then detects a response. Typically, the reader emits a radio frequency (RF) signal that is received by the transponder, after the transponder comes within an appropriate range. In response to the signal from the reader, the transponder sends a modulated RF signal back to the reader. The reader detects the modulated signal and can identify the transponder by decoding the modulated signal. After identifying the transponder, the reader can either store the decoded information or transmit the decoded signal to a computer. RFID tags can be used for storing and transmitting the item-level identification code.

The SBC label may serve as a back-up system for an RFID tag. The item-level identification code may be directly written onto the RFID tag. In this embodiment, the product-specific code and serial number are entered into an RFID system prior to, or immediately after, the SBC label has been attached to the item. The RFID system may then generate and write the corresponding item-level identification code to an RFID tag embedded in the SBC label. Data for the item may then be retrieved and stored with either an RFID reader or a bar code scanner. The RFID tag may also be adapted so that specific items can be monitored and tracked throughout the distribution system.

One or more embodiments of the invention may be useful in a manufacturing environment where it is desirable to create an item-level identification code at the point of origin. As discussed above, the manufacturer may associate each product-specific code with only one verification code. As a result, it may be possible for a manufacturer to associate all product-specific codes that are used in conjunction with one manufacturing area, such as a plant or packaging line with a single verification code. The manufacture may then pre-print serialized bar code labels that cover many product lines. As a result, the manufacturer may be able to switch between products without having to generate new serial numbers or labels. In addition, because the pre-printed labels cover many product-specific codes it may not be necessary to validate every label during the process. For instance, once it has been initially validated that the pre-printed labels are correctly associated with a particular product-specific code, the remaining products can be labeled without any further validation. In some embodiments, it may be desirable to re-verify the labels at predetermined time intervals, such as the start or end of a shift. As a result, the process of using pre-printed labels can be simplified and the possibility of incorrectly labeling an item may be reduced.

The labeling scheme of the invention may be readily adaptable to currently existing EPC numbering schemes. As a result, item-level identification codes generated in accordance with the invention may be used in various applications across many different industries.

The SBC labels of the invention may also be useful in combination with a point-of-sale terminal that may be adapted to combine the serial number and the product-specific code to form an item-level identification code. In some embodiments, the point-of-sale terminal may also be adapted to process product-specific information associated with the product-specific code and item-specific information associated with the item-level identification. The point-of-sale terminal may also include an item/product data processor device (IPDP) that is adapted to scan items having both a product-specific code and a serialized bar code to generate an item-level identification code. The IPDP may be used to reconstruct the item-level identification code at the point-of-sale. In some embodiments, the IPDP may be in communication with an item-level database that can be used to retrieve information specific to the item being scanned. Further details concerning such a device are discussed in commonly-assigned copending application Ser. No. 10/838,678 entitled POINT-OF-SALE SYSTEM AND METHOD FOR PROCESSING PRODUCT-SPECIFIC INFORMATION AND ITEM-SPECIFIC INFORMATION (Roberts), filed on May 5, 2004, the contents of which are hereby incorporated by reference in its entirety.

As should be evident from the above disclosure, the invention helps provide a simple and efficient method for labeling an item with a serialized bar code that can be used to generate a unique item-level identification code. It is envisioned that the labels of the invention can be used in a wide variety of applications that range from the registration of electronic serial numbers to the authentication of pharmaceutical drugs.

Many modifications and other embodiments of the invention set forth herein will come to mind to one skilled in the art to which these inventions pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of validating a label comprising:
   reading a product-specific code disposed on an item;
   retrieving a stored verification code corresponding to the product-specific code;
   reading a label verification code disposed on a label, wherein the label includes a serial number disposed thereon;
   determining whether the stored and label verification codes match, whereby if the stored and label verification codes match, then the label is valid; and
   combining the product-specific code with the serial number to generate an item-level identification code if the label is valid.

2. A method of validating a label according to claim 1, wherein the step of reading a product-specific code comprises scanning said product-specific code with a bar code scanner.

3. A method of validating a label according to claim 1, further comprising rejecting the label if the label and stored verification codes do not match.

4. A method of validating a label according to claim 1, wherein the product-specific code has a format selected from Uniform Product Codes, Global Trade Identification Numbers, and European Article Numbering Codes.

5. A method of validating a label according to claim 1, wherein the retrieving step further comprises retrieving said stored verification code from a database.

6. A method of validating a label according to claim 1, wherein the item comprises a pharmaceutical product.

7. A method according to claim 1, further comprising storing said item-level identification code in a database.

8. A method according to claim 1, wherein the serial number is in a bar code format and the serial number is read with a bar code scanner.

9. A method according to claim 1, wherein said label comprises an RFID transponder and said item-level identification code is written to said RFID transponder.

10. A method of labeling an item comprising:
    performing the method of claim 1; and
    if the stored and label verification codes match, then attaching the label to the item.

11. A method of labeling an item according to claim 10, wherein the label is attached adjacent to said product-specific code.

12. A method of generating an item-level identification code comprising:
   a) providing a verification code;
   b) associating a plurality of serial numbers with said verification code, wherein each serial number of said plurality of serial numbers is different from the remaining serial numbers of said plurality of serial numbers;
   c) associating one or more product-specific codes with said verification code; and
   d) combining one of said plurality of serial numbers with one of said product-specific codes to generate the item-level identification code.

13. A method according to claim 12, further comprising storing said item-level identification code in a database.

14. A method according to claim 12, wherein each of said one or more product-specific codes is disposed on an item.

15. An item-specific identifier system comprising:
   an item displaying a product-specific code;
   a label attached to the item distinct from the product-specific code, the label displaying a serial number and a verification code, wherein said serial number and said product-specific code are combined with each other to form an item-level identification code that is stored within a database.

16. An item-specific identifier system according to claim 15, wherein said verification code is displayed as a two-dimensional bar code.

17. An item-specific identifier system according to claim 15, wherein said serial number and said product-specific bar code are each displayed as a one-dimensional bar code.

18. An item-specific identifier system according to claim 15, wherein said product-specific code is associated within the database with no verification code other than said verification code displayed on the label.

19. An item-specific identifier system according to claim 15, wherein said label is attached to said item adjacent to said displayed product-specific code.

20. An item-specific identifier system according to claim 15, wherein said label comprises a RFID transponder and said item-level identification code is written to said RFID transponder.

21. An item-specific identifier system according to claim 15, further comprising a point-of-sale terminal adapted:
   to combine said serial number and said product-specific code to form an item-level identification code, and
   to process product-specific information associated with said product-specific code and item-specific information associated with said item-level identification code.

* * * * *